UNITED STATES PATENT OFFICE.

SAMUEL FLATCHER McDONALD, OF MEMPHIS, TENNESSEE.

PROCESS FOR MAKING BREAD.

1,177,345.     Specification of Letters Patent.     Patented Mar. 28, 1916.

No Drawing.     Application filed December 17, 1915. Serial No. 67,379.

*To all whom it may concern:*

Be it known that I, SAMUEL F. McDONALD, a citizen of the United States, and a resident of Memphis, in the county of Shelby and State of Tennessee, have invented a new and Improved Process for Making Bread, of which the following is a full, clear, and exact description.

In making bread salt is one of the most necessary ingredients and one of the most valuable flavoring agents, but it is substantially impossible to incorporate enough salt into the dough to produce a full salt flavor, for if it is used in sufficient quantity it retards fermentation, which means the evaporation of moisture from the dough or a proportional addition of fermenting agencies, which adds cost to the manufacture, particularly if the bread is made by machinery.

I have discovered that a full salt flavor of the bread can be obtained by a subsequent addition of salt to the dough, after it has been fermented with a quantity of salt therein not sufficient to give it a full salt flavor. In this way the fermentation of the dough is not retarded and an economy in time of preparing the dough and of fermentation agencies is obtained. A still greater economy results when the addition of salt to the fermented dough is made within the bread making machines as the dough is being shaped. The salt is preferably added through the dusters of the machine. It can be mixed with the cereals normally used for dusting in bread-making machines, or the use of cereals may be entirely dispensed with and salt alone used for dusting.

Salt is used to emphasize other flavors in bread. It is well known that salt applied to a cantaloupe will emphasize its sweetness. Likewise, salt applied to bread will emphasize the sweetness of its flavor and the sweetness of its various flavoring mediums. For instance, the sweetness of the wheat flavor will be emphasized.

In my process, the addition of salt to the dough is made after it has been fermented for from four to seven hours, which is the time ordinarily required for proper fermentation. The salt is added through the dusters of the dough-shaping machines by either dusting the salt on to the dough or the parts of the machines which shape, receive or carry the dough. It will be noted that the addition of the salt is made as the machine finishes the shaping of the dough to deliver it to the baking pans, consequently the addition of the salt is shortly before the dough is baked. The salt may be incorporated into the dough by sheeting the dough, sprinkling the sheets with salt, and recovering the salted sheets of dough with another sheet which may be salted, if desired, previous to shaping.

As the amount of salt dusted onto the dough while it passes through the machine can be varied, the flavoring of the bread can be varied accordingly. From the above description it will be seen that by incorporating salt subsequent to the fermentation of the dough, and while the dough is being passed through the machines, that is, while it is shaped, I not only obtain a better salt flavor of the bread but I economize on the dusting material used at present, for salt is cheaper than flour.

I claim:

1. A process for making bread, which consists in forming a dough containing salt and a fermenting agent, the quantity of salt in the dough being such as not to retard the fermentation of the dough, then adding salt to the fermented dough while it is being shaped.

2. The process for making bread, which consists in forming a dough containing salt and a fermenting agent, the quantity of salt in the dough being less than necessary to give to the bread a full salt flavor and whereby the fermentation of the dough is not retarded, letting the dough ferment, and then adding to the fermented dough an additional quantity of salt by sprinkling it over the dough while it is being shaped, the said subsequent addition of salt to the fermented dough being such as to give to the bread a full salt flavor.

3. In a process for making bread by machines, a step which consists in dusting the dough passing through the dough-shaping machines with salt to prevent the sticking of the dough and to enrich the dough with salt.

4. In a process for making bread by machines, a step which consists in adding salt to the dough while it passes through the dough-shaping machines.

5. As an article of manufacture, bread containing salt unaffected by the fermentation of the dough from which the bread is made by adding the salt to the dough after it has been fermented and while it is shaped.

In testimony whereof I have signed my name to this specification in the presence of two subscribing witnesses.

SAMUEL FLATCHER McDONALD.

Witnesses:
WALTER C. CHANDLER,
C. L. MARSILLIOT.

Copies of this patent may be obtained for five cents each, by addressing the "Commissioner of Patents, Washington, D. C."